US012768751B2

(12) United States Patent
Azizi et al.

(10) Patent No.: US 12,768,751 B2
(45) Date of Patent: Oct. 20, 2026

(54) SYSTEM AND METHOD FOR ESTIMATING TIRE WEAR USING ACOUSTIC FOOTPRINT ANALYSIS

(71) Applicant: Bridgestone Americas Tire Operations, LLC, Nashville, TN (US)

(72) Inventors: Yousof Azizi, Akron, OH (US); Thomas A. Sams, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 440 days.

(21) Appl. No.: 18/266,786

(22) PCT Filed: Jan. 6, 2022

(86) PCT No.: PCT/US2022/070054
§ 371 (c)(1),
(2) Date: Jun. 12, 2023

(87) PCT Pub. No.: WO2022/150824
PCT Pub. Date: Jul. 14, 2022

(65) Prior Publication Data

US 2024/0053231 A1 Feb. 15, 2024

Related U.S. Application Data

(60) Provisional application No. 63/134,764, filed on Jan. 7, 2021.

(51) Int. Cl.
*G01M 17/02* (2006.01)

(52) U.S. Cl.
CPC .................................. *G01M 17/025* (2013.01)

(58) Field of Classification Search
CPC ..... G01M 17/025; B60C 11/246; B60C 11/24
See application file for complete search history.

(56) References Cited

U.S. PATENT DOCUMENTS 6,112,167 A 8/2000 Zakelj
6,759,952 B2 7/2004 Dunbridge et al.
(Continued)

FOREIGN PATENT DOCUMENTS

CN 102741067 A 10/2012
CN 103842189 A 6/2014
(Continued)

OTHER PUBLICATIONS

Extended European Search Report for corresponding patent application No. 22737335.4, Oct. 28, 2024, 11 pages.
(Continued)

*Primary Examiner* — Timothy P Graves

(57) ABSTRACT

Systems and methods are disclosed herein for estimating tire wear based on acoustic footprint analysis. Tire-mounted sensors provide signals corresponding to dynamic mechanical behavior of the tire, and a computing device graphically constructs spectra comprising time and frequency content of the signals and implements models comprising predetermined spectra associated with an unworn version of the tire for comparison with the graphically constructed spectra for a footprint region of the tire. Graphical features of the spectra associated with the footprint region of the tire are extracted as predefined indicators of stiffness change based on the comparison, wherein tire wear state is estimated based on the extracted graphical features. Exemplary graphical features may include high frequency energy signatures at the footprint region, signal damping signatures at a trailing edge of the footprint region, increased energy signatures in a tread passage frequency band at the footprint region, and the like.

18 Claims, 3 Drawing Sheets

(56) References Cited

U.S. PATENT DOCUMENTS

| | | | | |
|---|---|---|---|---|
| 7,443,288 | B2 | 10/2008 | Dunbridge et al. | |
| 8,483,976 | B2 | 7/2013 | Morinaga | |
| 8,731,767 | B2 | 5/2014 | Paturle | |
| 8,881,573 | B2 | 11/2014 | Paturle et al. | |
| 8,892,298 | B2 | 11/2014 | Paturle et al. | |
| 9,050,864 | B2 | 6/2015 | Singh et al. | |
| 9,663,115 | B2 | 5/2017 | Singh | |
| 9,821,611 | B2 | 11/2017 | Singh | |
| 9,963,146 | B2 | 5/2018 | Singh et al. | |
| 10,112,444 | B2 | 10/2018 | Takahashi et al. | |
| 10,245,906 | B2 | 4/2019 | Singh et al. | |
| 10,286,734 | B2 | 5/2019 | Masago | |
| 10,365,248 | B2 | 7/2019 | Paturle et al. | |
| 10,603,962 | B2 | 3/2020 | Singh | |
| 10,830,908 | B2 | 11/2020 | Siegel et al. | |
| 2009/0115635 | A1 | 5/2009 | Berger | |
| 2010/0199756 | A1 | 8/2010 | Hanatsuka | |
| 2012/0266649 | A1 | 10/2012 | Paturle et al. | |
| 2012/0266650 | A1 | 10/2012 | Paturle | |
| 2014/0121997 | A1 | 5/2014 | Paturle | |
| 2014/0366618 | A1 | 12/2014 | Singh | |
| 2016/0121668 | A1* | 5/2016 | Singh .................. | G01M 17/007 702/42 |
| 2016/0161373 | A1 | 6/2016 | Singh et al. | |
| 2017/0113494 | A1 | 4/2017 | Singh et al. | |
| 2018/0154707 | A1 | 6/2018 | Singh | |
| 2020/0182746 | A1 | 6/2020 | Singh | |
| 2021/0237517 | A1* | 8/2021 | Suzuki .................. | B60C 11/246 |

FOREIGN PATENT DOCUMENTS

| | | | | |
|---|---|---|---|---|
| CN | 110186793 | A | 8/2019 | |
| JP | 2008039769 | A | 2/2008 | |
| JP | 2020164126 | A | 10/2020 | |
| KR | 101212584 | B1 | 12/2012 | |
| WO | 2019239305 | A2 | 12/2019 | |
| WO | WO-2020122188 | A1 * | 6/2020 | .......... G01M 17/025 |
| WO | 2020205703 | A1 | 10/2020 | |

OTHER PUBLICATIONS

International Search Report, corresponding international application No. PCT/US2022/070054, Apr. 27, 2022, 10 pages.

Chinese Patent Office, Chinese Office Action in Corresponding Application No. 2022800087690, dated Nov. 26, 2025, 6 pages.

* cited by examiner

SYSTEM AND METHOD FOR ESTIMATING TIRE WEAR USING ACOUSTIC FOOTPRINT ANALYSIS

FIELD OF THE DISCLOSURE

The present disclosure relates generally to wear estimation for tires on wheeled vehicles. More particularly, systems, methods, and related algorithms as disclosed herein may collect and analyze physical parameters such as for example physics-based vibration metrics for, e.g., improved estimation of tread depth for tires of wheeled vehicles including but not limited to motorcycles, consumer vehicles (e.g., passenger and light truck), commercial and off-road (OTR) vehicles.

BACKGROUND

Prediction of tire wear is an important tool for anyone owning or operating vehicles, particularly in the context of fleet management. As tires are used, it is normal for the tread to gradually become shallower and overall tire performance to change. Generally stated, the shallower the tire tread, the more easily the driver may lose traction when driving in rain, snow, or the like.

In addition, irregular tread wear may occur for a variety of reasons that may lead users to replace a tire sooner than would otherwise have been necessary. Vehicles, drivers, and individual tires are all different from each other, and can cause tires to wear at very different rates. For instance, high performance tires for sports cars wear more quickly than touring tires for a family sedan. However, a wide variety of factors can cause a tire to wear out sooner than expected, and/or cause it to wear irregularly and create noise or vibration. Two common causes of premature and/or irregular tire wear are improper inflation pressure and out-of-spec alignment conditions.

However, tire wear is a complex phenomenon to model. There are accurate models currently in existence that utilize finite element analysis (FEA), but these simulations can typically take weeks to complete. If it is desired to simulate the wear rate at several different tread depths, this would further take months of computationally expensive simulations.

It may be desirable to provide users with substantially real-time predictions about the performance and capabilities of their tires.

It may further be desirable to provide these services as part of a distributed and relatively automated tire-as-a-service model, without requiring manual tread depth measurements such as for example would typically be provided by field engineers and/or with dedicated equipment.

It may further be desirable to estimate the tread depth of the tire, and provide such feedback as an input to models for other useful/actionable predictions such as for example traction, fuel efficiency, durability, etc. An accurate tread depth prediction is the first step to predicting numerous other tire performance areas.

BRIEF SUMMARY

Generally stated, various embodiments of systems and methods as disclosed herein may implement detected mechanical responses, i.e. displacement, velocity, and/or acceleration of a rolling tire. The responses may preferably be measured directly using data acquisition systems, such as for example accelerometers, which are mounted in, on, or otherwise in association with the tire. The data acquisition system may continuously collect data as the tire is rolling on different roads and surfaces.

Various embodiments as disclosed herein may more particularly relate to carcass dynamic responses measured at the footprint (also referred to as the "contact patch") and/or near the footprint at its trailing edge. Accordingly, the accelerometer data when the mounted device is in the footprint (e.g., wherein the tread surface at a position radially outside of the installation point of the device is in contact with the road surface) or when the device is in the trailing edge region (i.e., where the location of the mounted device leaves the road surface) is analyzed.

An exemplary embodiment of a tire wear prediction method as disclosed herein includes collecting, via at least one data acquisition device mounted onboard a tire on a motor vehicle, signals corresponding to dynamic mechanical behavior of the tire. The method further includes graphically constructing spectra comprising time and frequency content of the signals and implementing at least one model comprising predetermined spectra associated with an unworn version of the tire for comparison with the graphically constructed spectra for a footprint region of the tire. One or more graphical features of the spectra associated with the footprint region of the tire are extracted as predefined indicators of stiffness change based on the comparison. A tire wear state may be estimated based on the extracted one or more graphical features, and an output signal is selectively generated based on the estimated tire wear state.

In one exemplary aspect in accordance with the above-referenced embodiment, the predetermined spectra associated with an unworn version of the tire are compared with the graphically constructed spectra for the footprint region of the tire using acoustic footprint analysis.

In another exemplary aspect in accordance with the above-referenced embodiment, the extracted one or more graphical features may comprise one or more of: a high frequency energy signature identified at the footprint region; a signal damping signature at a trailing edge of the footprint region; and an increased energy signature in a tread passage frequency band at the footprint region.

In another exemplary aspect in accordance with the above-referenced embodiment, graphically constructing the spectra comprises deconvoluting the signals into respective time, frequency, and amplitude content. For example, a time-frequency Short Time Fourier Transform (STFT) analysis may be used.

In another exemplary aspect in accordance with the above-referenced embodiment, the at least one model may be selected and retrieved for implementation based on a determined type of the tire.

In another embodiment as disclosed herein, the above-referenced method may be implemented via a system for tire wear prediction, including at least one data acquisition device mounted onboard a tire on a motor vehicle, and configured to generate signals corresponding to dynamic mechanical behavior of the tire, and a computing device communicatively linked to the at least one data acquisition device to receive the generated signals there from and configured to process the received signals accordingly.

In an exemplary aspect in accordance with the above-referenced system, the output signal may be provided to a display unit for selective display of one or more indicia corresponding to the estimated tire wear state.

In another exemplary aspect in accordance with the above-referenced system, the output signal may be provided to a vehicle control unit for automated intervention in one or more vehicle control attributes based on the estimated tire wear state.

In another exemplary aspect in accordance with the above-referenced embodiment, one or more data storage media may be communicatively linked to the computing device and having stored thereon the at least one model for selective retrieval and implementation based on a determined type of the tire.

Unless otherwise defined, all technical and scientific terms used herein have the same meaning as commonly understood by one of ordinary skill in the art to which this invention belongs. An invention as disclosed herein may be embodied in other specific forms without departing from the spirit or essential attributes thereof, and it is therefore desired that the various embodiments be considered in all aspects as illustrative and not restrictive. Any headings utilized in the description are for convenience only and no legal or limiting effect. Numerous objects, features and advantages of the embodiments set forth herein will be readily apparent to those skilled in the art upon reading of the following disclosure when taken in conjunction with the accompanying drawings.

DETAILED DESCRIPTION

Figure 1:
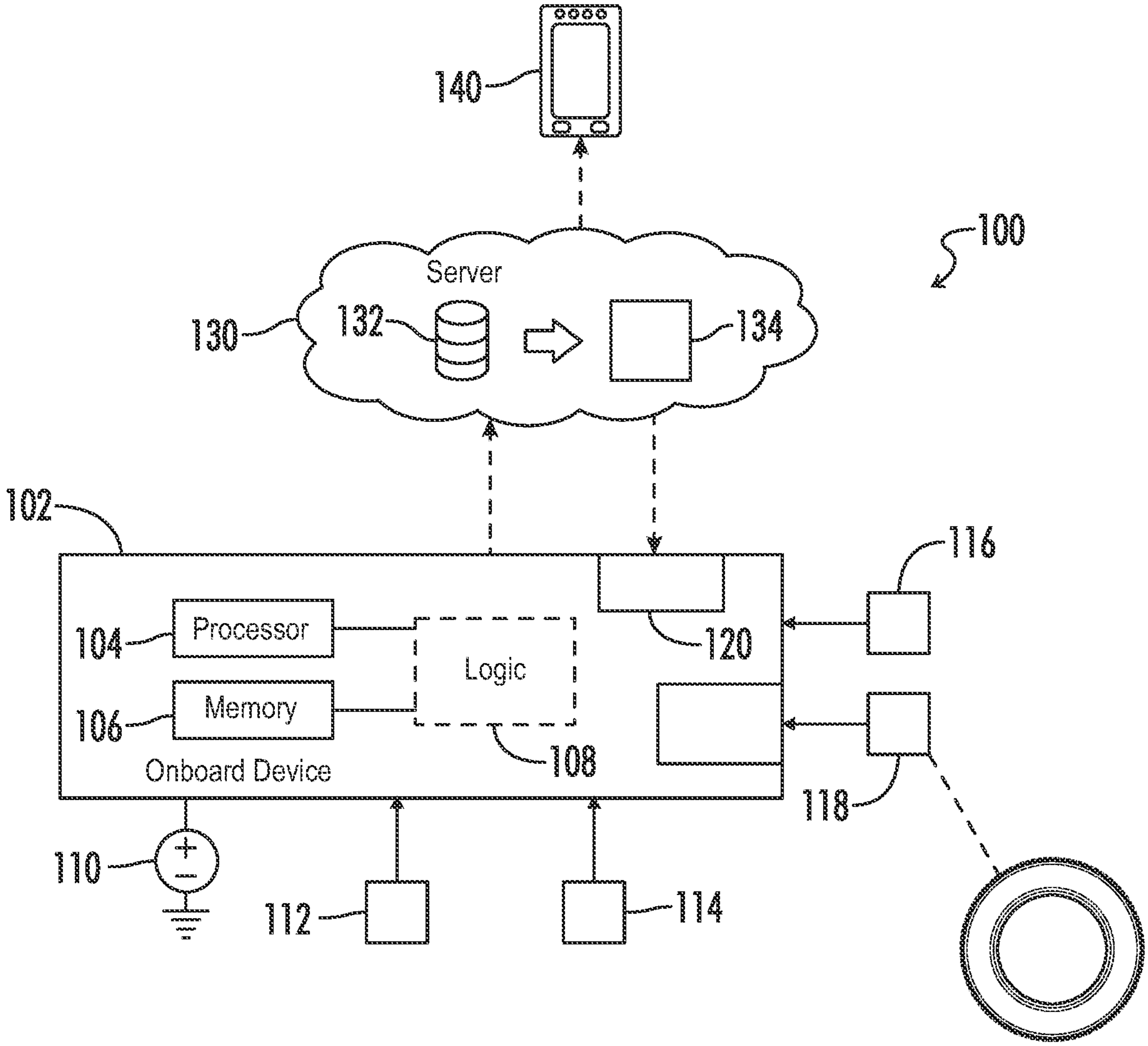
FIG. 1 is a block diagram representing an embodiment of a system for tread depth estimation as disclosed herein.

Referring generally to FIGS. 1-4B, various exemplary embodiments of an invention may now be described in detail. Where the various figures may describe embodiments sharing various common elements and features with other embodiments, similar elements and features are given the same reference numerals and redundant description thereof may be omitted below.

Various embodiments of a system as disclosed herein may include centralized computing nodes (e.g., a cloud server) in functional communication with a plurality of distributed data collectors and computing nodes (e.g., associated with individual users and/or vehicles) for effectively implementing at least tire wear prediction models as disclosed herein.

Referring initially to FIG. 1, an exemplary embodiment of the system 100 includes a computing device 102 that is onboard a vehicle and configured to at least obtain data and transmit said data to a remote server 130 and/or perform relevant computations as disclosed herein. The computing device may be portable or otherwise modular as part of a distributed vehicle data collection and control system (as shown), or otherwise may be integrally provided with respect to a central vehicle data collection control system (not shown). The device may include a processor 104 and memory 106 having program logic 108 residing thereon. The computing device 102 in various embodiments may be a vehicle electronic control unit (ECU) or a component thereof, or otherwise may be discrete in nature, for example permanently or detachably provided with respect to a vehicle mount.

Generally stated, a system 100 as disclosed herein may implement numerous components distributed across one or more vehicles, for example but not necessarily associated with a fleet management entity, and further a central server 130 or server network in functional communication with each of the vehicles via a communications network. The vehicle components may typically include one or more sensors such as, e.g., vehicle body accelerometers, gyroscopes, inertial measurement units (IMU), position sensors such as global positioning system (GPS) transponders 112, tire pressure monitoring system (TPMS) sensor transmitters 118 and associated onboard receivers, or the like, as linked for example to a controller area network (CAN) bus network and providing signals thereby to local processing units. The illustrated embodiment includes for illustrative purposes, without otherwise limiting the scope of the present invention thereby, an ambient temperature sensor 116, a vehicle speed sensor 114 configured to collect for example acceleration data associated with the vehicle, and a DC power source 110. One or more of the sensors as disclosed herein may be integrated or otherwise collectively located in a given modular structure as opposed to being discrete and decentralized in structure. For example, a tire-mounted TPMS sensor as referred to herein may be configured to generate output signals corresponding to each of a plurality of tire-specific conditions (e.g., acceleration, pressure, temperature).

Various bus interfaces, protocols, and associated networks are well known in the art for the communication between the respective data source and the local computing device, and one of skill in the art would recognize a wide range of such tools and means for implementing the same.

It should be noted that the embodiment represented in FIG. 1 is not limiting on the scope of a system or method as disclosed herein, and that in alternative embodiments one or more of the models 134 may be implemented locally at the onboard computing device 102 (e.g., electronic control unit) rather than at the server level. For example, models 134 may be generated and trained over time at the server level and downloaded to the onboard computing device 102 for local execution of one or more steps or operations as disclosed herein.

In other alternative embodiments, one or more of the various sensors 112, 114, 116, 118 may be configured to communicate directly with the remote server 130, or via a mobile computing device (not shown) carried by a user of the vehicle, rather than via the onboard computing device 102.

The system 100 may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device in some embodiments being functionally linked to the onboard device 102 via a communications network. System programming information may for example be provided on-board by the driver or from a fleet manager.

The term “user interface” as used herein may, unless otherwise stated, include any input-output module by which a user device facilitates user interaction with respect to a server and/or device as disclosed herein including, but not limited to, downloaded or otherwise resident program applications; web browsers; web portals, such as individual web pages or those collectively defining a hosted website; and the like. A user interface may further be described with respect to a personal mobile computing device in the context of buttons and display portions which may be independently arranged or otherwise interrelated with respect to, for example, a touch screen, and may further include audio and/or visual input/output functionality even without explicit user interactivity.

Vehicle and tire sensors 112, 114, 116, 118 may in an embodiment further be provided with unique identifiers, wherein the onboard device processor 104 can distinguish between signals provided from respective sensors on the same vehicle, and further in certain embodiments wherein a central server 130 and/or fleet maintenance supervisor client device 140 may distinguish between signals provided from tires 101 and associated vehicle and/or tire sensors across a plurality of vehicles. In other words, sensor output values may in various embodiments be associated with a particular tire 101, a particular vehicle, and/or a particular tire-vehicle system for the purposes of onboard or remote/downstream data storage and implementation for calculations as disclosed herein. The onboard device processor 104 may communicate directly with the hosted server 130 as shown in FIG. 1, or alternatively the driver’s mobile device or truck-mounted computing device may be configured to receive and process/transmit onboard device output data to the hosted server 130 and/or fleet management server/device 140.

Signals received from a particular vehicle and/or tire sensor 112, 114, 116, 118 may be stored in onboard device memory 106, or an equivalent data storage network functionally linked to the onboard device processor 104, for selective retrieval as needed for calculations according to the method disclosed herein. A “data storage network” as used herein may refer generally to individual, centralized, or distributed logical and/or physical entities configured to store data and enable selective retrieval of data therefrom, and may include for example but without limitation a memory, look-up tables, files, registers, databases, and the like. In some embodiments, raw data signals from the various sensors 112, 114, 116, 118 may be communicated substantially in real time from the vehicle to the server 130. Alternatively, particularly in view of the inherent inefficiencies in continuous data transmission of high frequency data, the data may for example be compiled, encoded, and/or summarized for more efficient (e.g., periodic time-based or alternatively defined event-based) transmission from the vehicle to the remote server 130 via an appropriate communications network.

The vehicle data and/or tire data, once transmitted via a communications network to the hosted server 130, may be stored for example in a database 132 associated therewith. The server 130 may include or otherwise be associated with one or more algorithmic models 134 as disclosed herein for selectively retrieving and processing the vehicle data and/or tire data as appropriate inputs. The models 134 may be implemented at least in part via execution of a processor, enabling selective retrieval of the vehicle data and/or tire data and further in electronic communication for the input of any additional data or algorithms from a database, lookup table, or the like that is stored in association with the server 130.

The system 100 may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device 140 in some embodiments being functionally linked to the onboard device 102 via a communications network. System programming information may for example be provided on-board by the driver or from a fleet manager.

Figure 2:
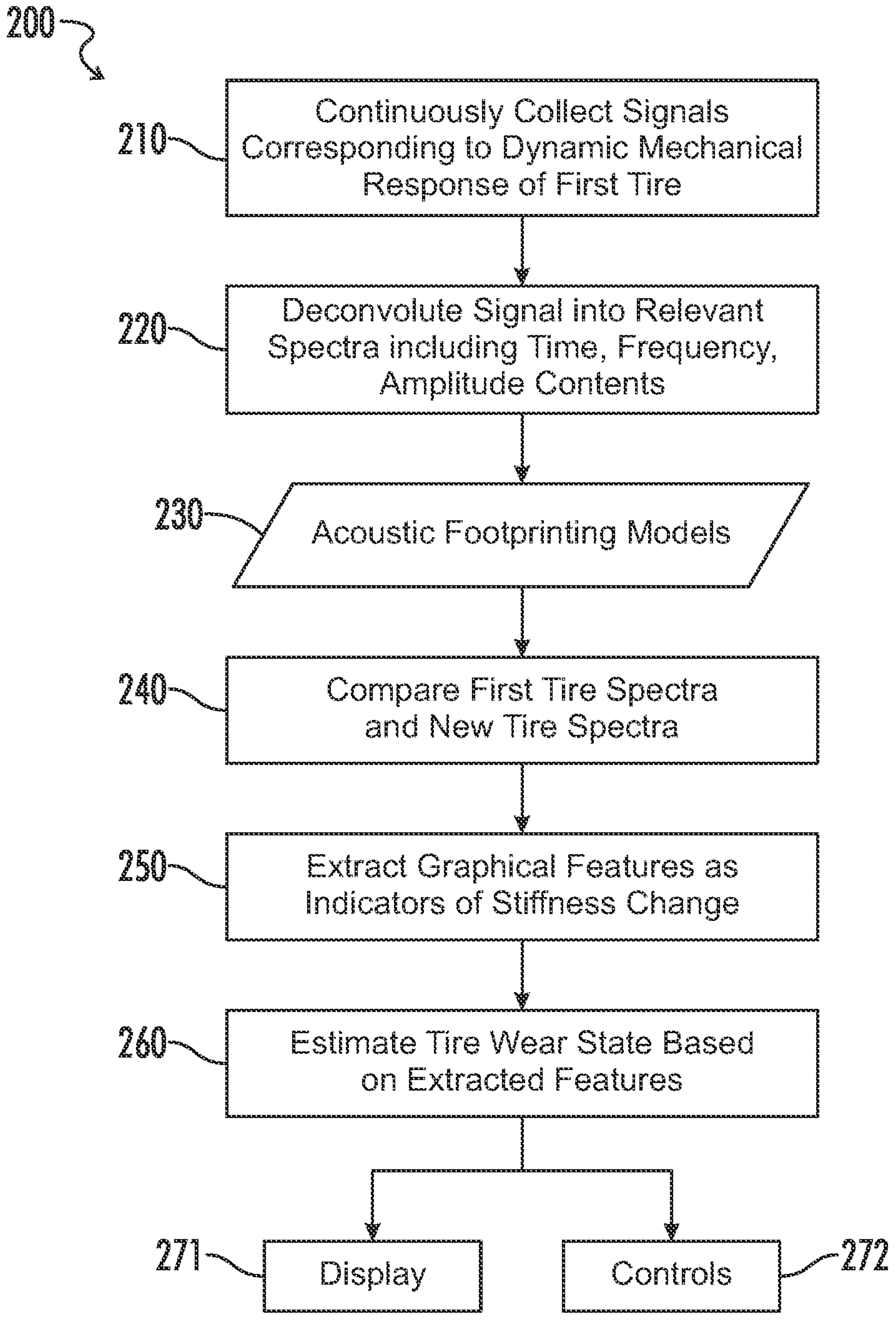
FIG. 2 is a flowchart representing an embodiment of a method for tread depth estimation as disclosed herein.

An exemplary method 200 as represented in FIG. 2 may now be described for predicting tire wear based on relevant physical parameters for a given tire. In a particular embodiment as follows, physics-based vibration metrics are developed and implemented in the context of an acoustic footprint analysis.

The method 200 begins with collected signals corresponding to a mechanical response, e.g., displacement, velocity, and/or acceleration of a rolling tire (step 210). As previously noted, a data collection stage may implement conventional data acquisition devices, such as accelerometers, which are mounted on the tire and generate signals corresponding to the dynamic mechanical responses. The data acquisition device may continuously collect data as the tire is rolling on different roads and surfaces.

As noted above, the collected signals from the data acquisition device may be processed locally, for example at an electronic control unit residing on the vehicle, or remotely at for example a cloud server node. The system may further have previously stored, or otherwise made accessible, information corresponding to each of a plurality of tires of similar type to, and even including the tire at issue. Such information may for example include an initial wear value and/or expected wear rate for the type of tire at issue, either of which may be useful as a baseline or point of comparison for subsequently and empirically developed wear states or wear rates.

In the present embodiment, carcass-related dynamic responses of particular interest may be measured at the footprint and proximate the footprint, for example at the trailing edge thereof. Thus, the accelerometer data when the mounted device is in the footprint or when the device is in the trailing edge region is analyzed. As used herein, the term “footprint region” may (unless otherwise specifically stated) describe the footprint itself and further include the leading edge and the trailing edge thereof. Accordingly, certain signatures correlating with changes in stiffness as developed in accordance with techniques as disclosed herein may for example encompass responses measured just after a trailing edge of the footprint, but are nonetheless described for illustrative purposes as being in the footprint region.

For that purpose, time-frequency short time Fourier Transform (STFT) analysis may for example be used to deconvolute the signal into spectra comprising its time, frequency and amplitude components (step 220).

Proceeding under a principle that tire wear leads to stiffer tread lugs, various acoustic footprint models 230 may be developed and implemented for the identification and implementation of defined signatures in the analyzed STFT spectrum indicative of stiffness change due to wear. The signatures may be predefined and retrievably stored for system implementation. In addition or in the alternative, the system as disclosed herein may for example be configured to automatically define and classify specific time domain and/or frequency domain characteristics of the measured energy into groups or classes that can then be correlated or otherwise identified with respect to a common condition (i.e., stiffness). One of skill in the art may appreciate that numerous machine learning techniques as known in the art may be modified as needed to implement steps disclosed herein, e.g., to classify signal characteristics associated with a stiffness signature. By comparing the respective spectra for a worn tire and a new (unworn) tire of similar type or otherwise relevant thereto using the acoustic footprint models (step 240), these graphical features can be extracted as tire wear indicators (step 250).

Figure 3A:
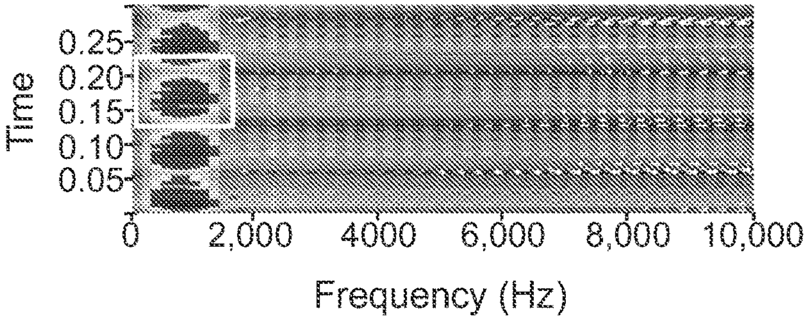
FIG. 3A is a graphical diagram representing exemplary spectra comprising first physics based acoustic footprint features for an unworn tire according to an embodiment as disclosed herein.
Figure 3B:
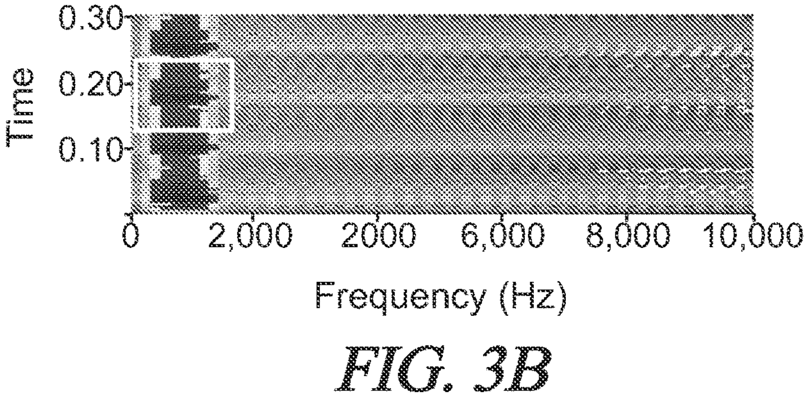
FIG. 3B is a graphical diagram representing exemplary spectra corresponding to the spectra of FIG. 3A but for a worn tire according to an embodiment as disclosed herein.
Figure 4A:
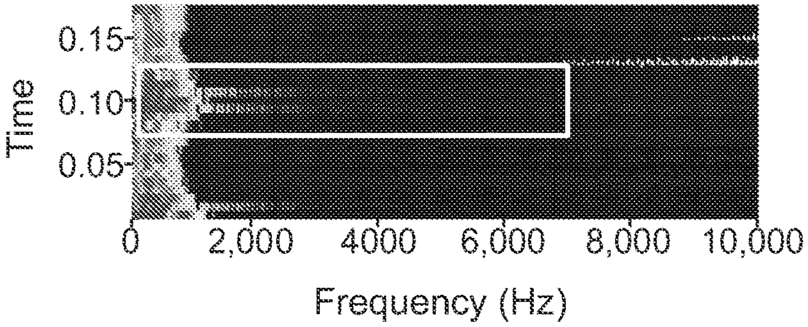
FIG. 4A is a graphical diagram representing exemplary spectra comprising second physics based acoustic footprint features for an unworn tire according to an embodiment as disclosed herein.
Figure 4B:
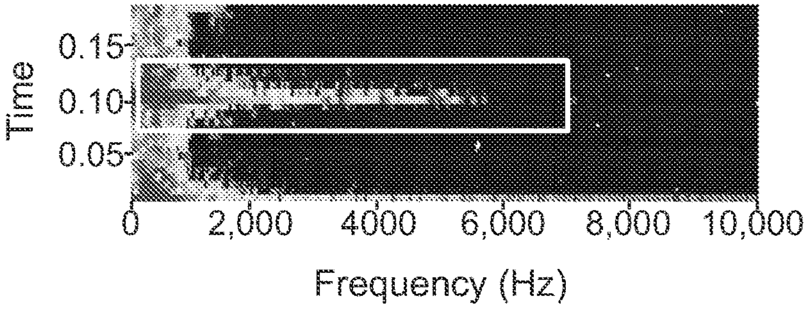
FIG. 4B is a graphical diagram representing exemplary spectra corresponding to the spectra of FIG. 4A but for a worn tire according to an embodiment as disclosed herein.

As noted above, transformation of the signals may preferably be conducted to provide time-frequency domain analysis. Referring to FIGS. 3A (representing a "new" tire) and 3B (representing a "worn" tire), temporal effects may be identified via comparison of the respective spectra to extract dynamic physics-based acoustic footprint features. Referring further to FIGS. 4A (representing a "new" tire) and 4B (representing a "worn" tire), post-resonance effects may likewise be identified via comparison of the respective spectra. One example of signatures or "tire wear indicators" may appear in the deconvoluted response as an increased amount of high frequency energy content at the footprint for the worn tire, for example relative to the footprint portion in the spectra of the new tire being compared thereto. In another example, relatively higher damping effects may be extracted from the deconvoluted response just after the footprint at the trailing edge. In another example, relatively higher energy effects may be extracted from the deconvoluted response in a tread passage frequency band at the footprint for the worn tire. It may be understood that various additional and/or alternative signatures may be identified as correlating with changes in stiffness for a given tire or type of tire, and therefore capable of being developed and implemented as part of or otherwise within the scope of a tire wear model as disclosed herein.

In an embodiment, selection of relevant models and/or associated indicators to be identified and extracted may be predetermined based for example on a type of tire.

In step 260, one or more extracted effects as disclosed herein may be implemented in a model/algorithm for estimation of a current tire wear state. The wear model 134 may be implemented at the vehicle, for processing via the onboard system, or the tire data and/or vehicle data may be processed to provide representative data to the hosted server for remote wear estimation.

Output signals corresponding to the estimated tire wear state may optionally be generated to a display unit for the display of indicia to a user (step 271). The indicia may for example relate to an estimated amount of remaining tire tread, an estimated life remaining as a duration or a percentage, or the like. The indicia may be in the form of an alert, for example color-coded in nature to indicate the tire wear state, with or without specific alphanumeric indicators on a user interface.

Output signals corresponding to the estimated tire wear state may optionally be generated to a control unit (step 272), for example associated with the vehicle such that certain vehicle operations may be corrected or otherwise account for changes in the tire wear.

In an embodiment the method 200 may involve providing the tire wear estimations as inputs to a model for predicting wear values at one or more future points in time, wherein such predicted values may be compared to respective threshold values. For example, a feedback signal corresponding to the predicted tire wear status (e.g., predicted tread depth at a given distance, time, or the like) may be provided via an interface to an onboard device 102 associated with the vehicle itself, or to a mobile device associated with a user, such as for example integrating with a user interface configured to provide alerts or notice/recommendations that a tire should or soon will need to be replaced. Other tire-related threshold events can be predicted and implemented for alerts and/or interventions within the scope of the present disclosure and based on predicted tire wear, including for example tire rotation, alignment, inflation, and the like. The system 100 may generate such alerts and/or intervention recommendations based on individual thresholds, groups of thresholds, and/or non-threshold algorithmic comparisons with respect to predetermined parameters.

The tire wear status (e.g., tread depth) may for example be provided along with certain vehicle data as inputs to a traction model, which may be configured to provide an estimated traction status or one or more traction characteristics for the respective tire. The traction model may comprise "digital twin" virtual representations of physical parts, processes or systems wherein digital and physical data are paired and combined with learning systems such as for example artificial neural networks. Real vehicle data and/or tire data from a particular tire, vehicle or tire-vehicle system may be provided throughout the life cycle of the respective asset to generate a virtual representation of the vehicle tire for estimation of tire traction, wherein subsequent comparison of the estimated tire traction with a corresponding measured or determined actual tire traction may preferably be implemented as feedback for machine learning algorithms executed at the server level.

The traction model may in various embodiments utilize the results from prior testing, including for example stopping distance testing results, tire traction testing results, etc., as collected with respect to numerous tire-vehicle systems and associated combinations of values for input parameters (e.g., tire tread, inflation pressure, road surface characteristics, vehicle speed and acceleration, slip rate and angle, normal force, braking pressure and load), wherein a tire traction output may be effectively predicted for a given set of current vehicle data and tire data inputs.

In one embodiment, outputs from this traction model may be incorporated into an active safety system. The term "active safety systems" as used herein may preferably encompass such systems as are generally known to one of skill in the art, including but not limited to examples such as collision avoidance systems, advanced driver-assistance systems (ADAS), anti-lock braking systems (ABS), etc., which can be configured to utilize the traction model output information to achieve optimal performance. For example, collision avoidance systems are typically configured to take evasive action, such as automatically engaging the brakes of a host vehicle to avoid or mitigate a potential collision with a target vehicle, and enhanced information regarding the traction capabilities of the tires and accordingly the braking capabilities of the tire-vehicle system are eminently desirable.

In another embodiment, a ride-sharing autonomous fleet could use output data from the traction model to disable or otherwise selectively remove vehicles with low tread depth from use during inclement weather, or potentially to limit their maximum speeds.

In various embodiments, the method may further involve comparing a current wear value with respect to a threshold value to determine whether (or when) the tire requires intervention such as for example replacement. The method may alternatively or further include predicting wear values at one or more future points in time, wherein such predicted values may be compared to respective threshold values. As represented for example in FIG. 1, a feedback signal corresponding to the predicted tire wear status (e.g., predicted tread depth at a given distance, time, or the like) may be provided via an interface 120 to an onboard device 102 associated with the vehicle itself, or to a mobile device 140 associated with a user, such as for example integrating with a user interface configured to provide alerts or notice/recommendations that a tire should or soon will need to be replaced.

As another example, an autonomous vehicle fleet may comprise numerous vehicles having varying minimum tire wear status (e.g., tread depth) values, wherein the fleet management system may be configured to disable deployment of vehicles falling below a minimum threshold. The fleet management system may further implement varying minimum tread status values corresponding to wheel positions. The system may accordingly be configured to act upon a minimum tire tread value for each of a plurality of tires associated with a vehicle, or in an embodiment may calculate an aggregated tread status for the plurality of tires for comparison against a minimum threshold.

In various embodiments the method may further include data streaming even where threshold violations are not detected, wherein estimated and/or predicted wear values can be displayed in real-time on the local user interface and/or a remote display (e.g., associated with the fleet management server).

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Whereas certain preferred embodiments of the present invention may typically be described herein with respect to tire wear estimation for fleet management systems and more particularly for autonomous vehicle fleets or commercial trucking applications, the invention is in no way expressly limited thereto and the term "vehicle" as used herein unless otherwise stated may refer to an automobile, truck, or any equivalent thereof, whether self-propelled or otherwise, as may include one or more tires and therefore require accurate estimation or prediction of tire wear and potential disabling, replacement, or intervention in the form of for example direct vehicle control adjustments.

The term "user" as used herein unless otherwise stated may refer to a driver, passenger, mechanic, technician, fleet management personnel, or any other person or entity as may be, e.g., associated with a device having a user interface for providing features and steps as disclosed herein.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A tire wear prediction method, comprising:

training at least one learning model over time at a server network, for each of a plurality of tire types, to define and classify spectra comprising specific time and frequency domain characteristics of measured energy from input signals corresponding to dynamic mechanical behavior of a tire, for each of a plurality of graphical features associated with a footprint region of the tire and at each of an unworn tire state and a plurality of tire wear states, as further correlated with respective indicators of stiffness change;

downloading at least one model to an onboard computing device associated with a motor vehicle, wherein the downloaded at least one model is selected based on a tire type mounted on the motor vehicle;

collecting, via at least one data acquisition device mounted onboard a tire on the motor vehicle, signals corresponding to dynamic mechanical behavior of the tire;

graphically constructing spectra comprising time and frequency content of the signals;

extracting, via the downloaded at least one model, one or more graphical features of the spectra associated with the footprint region of the tire as predefined indicators of stiffness change based on a comparison of the graphically constructed spectra with predetermined spectra associated with an unworn version of the tire;

estimating, via the downloaded at least one model, a tire wear state based on the extracted one or more graphical features; and selectively generating an output signal based on the estimated tire wear state.

2. The method according to claim 1, wherein the extracted one or more graphical features comprise one or more of:

a high frequency energy signature identified at the footprint region;

a signal damping signature at a trailing edge of the footprint region; and an increased energy signature in a tread passage frequency band at the footprint region.

3. The method according to claim 1, wherein graphically constructing the spectra comprises deconvoluting the signals into respective time, frequency, and amplitude content.

4. The method according to claim 3, wherein the signals are deconvoluted via Short Time Fourier Transform analysis.

5. The method of claim 1, comprising:

comparing the estimated tire wear state with a measured actual value of a tire wear state of the tire;

generating a feedback signal to the server network based on the comparison; and further training of the at least one model at the server network based at least in part thereon.

6. A system for tire wear prediction, comprising:

a server network configured to train at least one learning model over time, for each of a plurality of tire types, to define and classify spectra comprising specific time and frequency domain characteristics of measured energy from input signals corresponding to dynamic mechanical behavior of a tire, for each of a plurality of graphical features associated with a footprint region of the tire and at each of an unworn tire state and a plurality of tire wear states, as further correlated with respective indicators of stiffness change;

at least one data acquisition device mounted onboard a tire on a motor vehicle, and configured to generate signals corresponding to dynamic mechanical behavior of the tire;

a computing device communicatively linked to the server network and configured to download at least one model therefrom, wherein the downloaded at least one model is selected based on a tire type of the tire mounted on the motor vehicle;

the computing device is communicatively linked to the at least one data acquisition device to receive the generated signals there from, wherein the computing device is further configured to graphically construct spectra comprising time and frequency content of the signals, extract, via the downloaded at least one model, one or more graphical features of the spectra associated with the footprint region of the tire as predefined indicators of stiffness change based on a comparison of the graphically constructed spectra with predetermined spectra associated with an unworn version of the tire, estimate, via the downloaded at least one model, a tire wear state based on the extracted one or more graphical features, and selectively generate an output signal based on the estimated tire wear state.

7. The system of claim 6, wherein the output signal is provided to a display unit for selective display of one or more indicia corresponding to the estimated tire wear state.

8. The system of claim 6, wherein the output signal is provided to a vehicle control unit for automated intervention in one or more vehicle control attributes based on the estimated tire wear state.

9. The system of claim 6, wherein the extracted one or more graphical features comprise one or more of:

a high frequency energy signature identified at the footprint region;

a signal damping signature at a trailing edge of the footprint region; and an increased energy signature in a tread passage frequency band at the footprint region.

10. The system of claim 6, wherein graphically constructing the spectra comprises deconvoluting the signals into respective time, frequency, and amplitude content.

11. The system of claim 10, wherein the signals are deconvoluted via Short Time Fourier Transform analysis.

12. The system of claim 6, wherein:

the computing device is configured to compare the estimated tire wear state with a measured actual value of a tire wear state of the tire, and to generate a feedback signal to the server network based on the comparison; and the server network is configured to further train the at least one model based at least in part on the feedback signal.

13. A computing device for mounting onboard a motor vehicle, and configured to:

receive, from at least one tire-mounted data acquisition device, generated signals corresponding to dynamic mechanical behavior of the tire;

graphically construct spectra comprising time and frequency content of the signals;

download from a remote server and implement at least one model comprising predetermined spectra associated with an unworn version of the tire for comparison with the graphically constructed spectra for a footprint region of the tire;

extract one or more-graphical features of the spectra associated with the footprint region of the tire as predefined indicators of stiffness change based on the comparison;

estimate a tire wear state based on the extracted one or more graphical features;

selectively generate an output signal based on the estimated tire wear state;

compare an estimated tire wear state with a corresponding measured actual value of a tire wear state of the tire; and generate a feedback signal to the remote server for further training of the at least on model based on the comparison.

14. The device of claim 13, wherein the output signal is provided to a display unit for selective display of one or more indicia corresponding to the estimated tire wear state.

15. The device of claim 13, wherein the output signal is provided to a vehicle control unit for automated intervention in one or more vehicle control attributes based on the estimated tire wear state.

16. The device of claim 13, wherein the extracted one or more graphical features comprise one or more of:

a high frequency energy signature identified at the footprint region;

a signal damping signature at a trailing edge of the footprint region; and an increased energy signature in a tread passage frequency band at the footprint region.

17. The device of claim 13, wherein graphically constructing the spectra comprises deconvoluting the signals into respective time, frequency, and amplitude content.

18. The device of claim 17, wherein the signals are deconvoluted via Short Time Fourier Transform analysis.

* * * * *